No. 840,613. PATENTED JAN. 8, 1907.
F. FINDEISEN.
FLUSHING TANK.
APPLICATION FILED JULY 24, 1905.
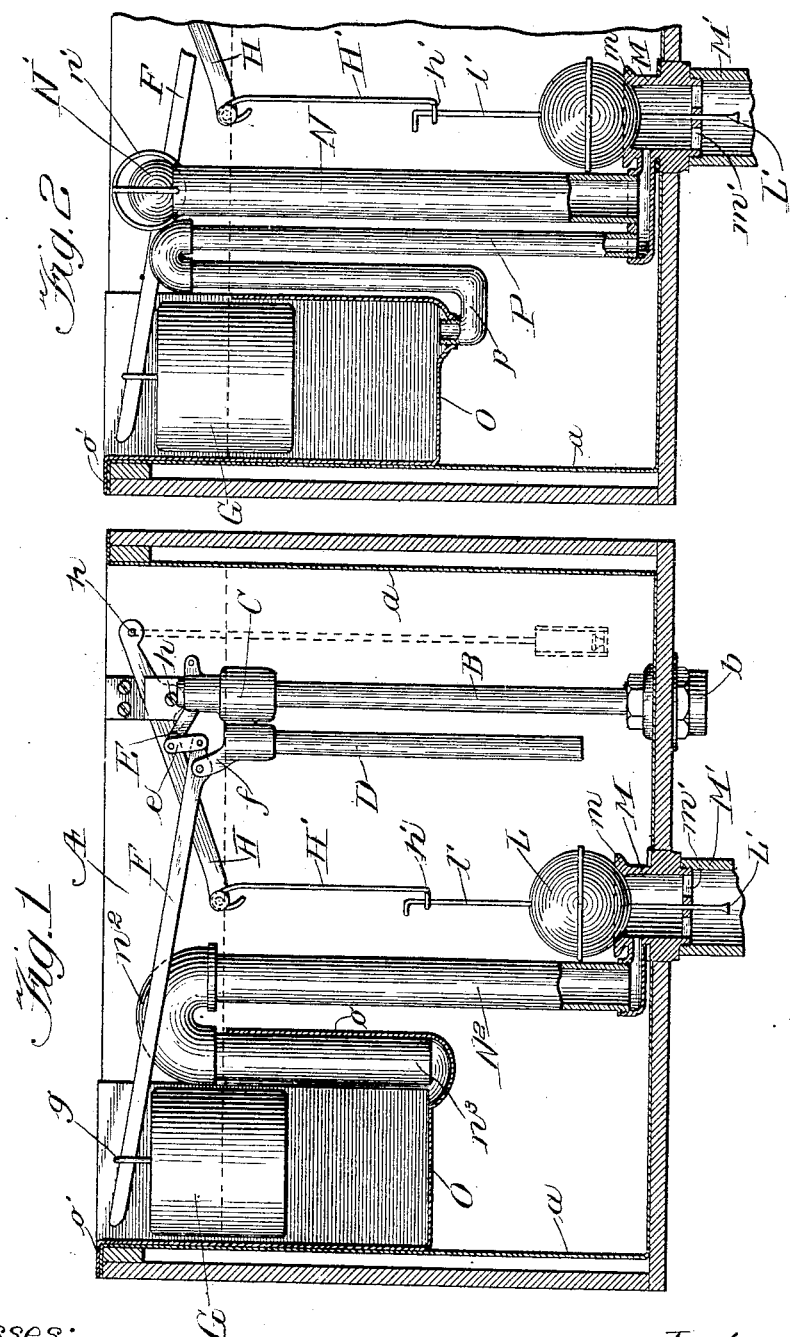
Witnesses:
Inventor:
Frederick Findeisen
by Chamberlin & Wilkinson
Attys.

UNITED STATES PATENT OFFICE.

FREDERICK FINDEISEN, OF CHICAGO, ILLINOIS.

FLUSHING-TANK.

No. 840,613.      Specification of Letters Patent.      Patented Jan. 8, 1907.

Application filed July 24, 1905. Serial No. 270,908.

*To all whom it may concern:*

Be it known that I, FREDERICK FINDEISEN, a citizen of the United States, residing at Chicago, county of Cook, State of Illinois, have invented a certain new and useful Improvement in Flushing-Tanks; and I declare the following to be a full, clear, and exact description of the invention, such as will enable others skilled in the art to which it pertains to make and use the same, reference being had to the accompanying drawings, which form a part of this specification.

My invention relates in general to flushing-tanks for water-closet bowls, and more particularly to that type in which the bowl is flushed by siphonic action.

In the usual flushing-tanks for water-closets the water is admitted to the tank through a valve which is opened and closed by a float supported upon the water in the tank. The gradual lowering of the float as the water is discharged from the tank results in the valve being gradually opened, so that water commences to flow to the tank while it is being discharged therefrom, with the result that water is wasted. After the discharge-valve from the tank is closed the gradual rise of the water within the tank slowly elevates the float and gradually drives the valve to its seat, which results in a hissing sound being produced by the water being forced through the decreasing space between the valve-seat and its plunger. Another objection to the usual form of flushing-tank is that the amount of water supplied to the tank varies according to the pressure in the service-pipe. When there is a low service-pressure, the valve closes sooner than when it must seat against a greater pressure. It is therefore necessary to adjust the float in each tank according to the pressure of the service-pipe supplying water thereto in order that the desired quantity of water may be supplied to the tank for flushing the bowl.

In the type of bowls which are flushed by siphonic action after the discharge from the tank ceases they are left with insufficient water to cover the trap and prevent the admission of sewer-gas. It is therefore necessary in this type of bowls to furnish a light after-flush or refill sufficient to cover the trap. It has heretofore been customary to supply such refill to the overflow-pipe from a tube leading from the inlet-valve which supplies water to the bowl while the tank is being filled. The objection to this manner of supplying the refill is that insufficient water is supplied when the pressure is low, and when the pressure is high the supply is unnecessarily great, thereby wasting the water.

The primary object of my invention is to provide a flushing-tank for water-closet bowls in which the supply-valve will remain closed until the water has completely discharged from the tank and will then quickly open and remain fully open until the desired quantity has been supplied to the tank, when it will quickly seat, thereby insuring a fixed quantity of water being supplied to the tank regardless of the service-pressure, as well as avoiding waste of water and obviating the disagreeable hissing sound due to the gradual closing of the valve.

A further object of my invention is to provide a flushing-tank in which a constant amount of water regardless of the service-pressure will be supplied to the bowl to refill the same after it has been flushed.

A still further object of my invention is to provide a flushing-tank for water-closet bowls which will be simple in construction, inexpensive in manufacture, and efficient in use.

My invention will be more fully described hereinafter with reference to the accompanying drawings, in which the same is illustrated as embodied in two convenient and practical forms, and in which—

Figure 1 is a vertical central sectional view, parts being shown in elevation; and Fig. 2, a view similar to Fig. 1, showing a modification.

Similar reference characters are used to indicate similar parts in the two figures of the drawings.

Reference character A indicates a flush-tank of any desired size and construction, the interior of which is provided with a lining $a$.

B indicates the supply-pipe extending upwardly within the tank and provided at its lower end with a coupling $b$, with which communicates a pipe leading from the water-service pipe.

C indicates a valve-casing within which is a valve of any usual construction (not shown) for controlling the flow of water from the supply-pipe B to the downwardly-extended pipe D.

E indicates a lever for opening and closing the supply-valve, one end of which is fulcrumed, while the other end is provided with a link $e$, pivotally connected to the end of a lever F. The lever F is fulcrumed upon a bracket $f$ and is connected at its opposite end with a float G.

H indicates a lever for unseating the discharge-valve L, the latter being provided with an upwardly-extending rod $l'$, loosely engaging at its upper end an eye $h'$ at the lower end of a rod H', the latter being pivotally connected to the lever H. Connected to the opposite end of the lever H is a pin $h$, extending to the exterior of the tank, by means of which the lever H is oscillated to unseat the valve L.

M indicates a fitting secured in the bottom of the tank and provided with a circular seat $m$, with which the valve L coöperates. The lower end of the fitting communicates with a pipe M', leading to the water-closet bowl. A guide $m'$ is provided with the fitting M, through which extends a rod L', depending from the valve L.

The construction above described is well known and forms no part of my invention, except in combination with the parts subsequently to be described. Any other construction of flushing-tank might equally well be used in coöperation with my invention, the form disclosed being merely shown as a convenient one in connection with which to illustrate and describe my invention.

O indicates a small compartment or chamber supported within the tank A and of a horizontal cross-section only slightly greater than that of the float G. The compartment O may be formed by any desired means for convenience, it being shown as a separate receptacle supported at its upper end by a flange $o'$, projecting over the upper edge of the adjacent walls of the tank A. The chamber O is closed at its bottom and open at its top, one or more of its walls being of such a height as to permit a communication between the interior of the tank and the interior of the compartment when there is the desired water-level in the tank.

$N^2$ indicates a pipe communicating at its lower end with the fitting M below the seat $m$ and may conveniently be the usual overflow-pipe, a coupling $n^2$ being provided at its upper end, from which depends a pipe $n^3$, extending downwardly within an extension $o$ of the compartment O.

The operation of the embodiment of my invention above described is as follows: When the parts are in the position shown in Fig. 1, the tank contains the desired amount of water for flushing the bowl. When the bowl is to be flushed, the lever H is oscillated, so as to lift the valve L, which is in the form of a hollow ball, from its seat $m$, thereby permitting the water in the tank to flow through the discharge-pipe M'. The flow of the water through the fitting M past the port communicating with the lower end of the pipe $N^2$ creates a suction within such pipe, so that the water within the compartment O is drawn upwardly through the pipe $n^3$ into the pipe $N^2$, thence to the discharge-pipe M' to refill the bowl after it has been flushed by the water from the tank. The discharge of the water from the compartment O permits the float G to fall, thereby oscillating the lever F and unseating the inlet-valve, so that water is supplied to the tank through the pipes B and D. The supply of water to the tank continues until the level thereof has reached the upper edge of the side wall of the compartment O, when it flows into such compartment, quickly filling the same and lifting the float, so that the inlet-valve is seated and the supply of water stopped.

The opening leading from the lower end of the pipe $N^2$ to the fitting M is so restricted in size that the flow of water through the fitting from the tank does not start the siphonic discharge of water from the chamber O until after the seating of the outlet-valve L. Immediately upon the outlet-valve seating the column of water flowing downwardly through the conduit M' creates such a suction that the siphonic discharge of water from the chamber O is affected.

In Fig. 2 I have illustrated a slightly-modified embodiment of my invention in which the compartment O communicates with the discharge-pipe M' through a conduit $p$ and P separate and distinct from the usual overflow-pipe N, the latter being provided with the usual ball-valve N' at its upper end surrounded by a cage $n'$.

The operation of the form of my invention shown in Fig. 2 is the same in all respects as that of the embodiment shown in Fig. 4, except that in Fig. 1 the overflow occurs through the same pipe which also serves to draw the water from the compartment O to refill the bowl.

From the foregoing description it will be observed that in my improvement the inlet-valve is only opened after the water has been discharged from the tank and the discharge-valve seated, thereby preventing the waste of water which would result from the inlet and discharge valves both being open at the same time. It is also evident that when the inlet-valve is open it remains fully open until the water supplied to the tank reaches the level of the side wall of the compartment, when it will quickly fill the compartment and almost instantly close the inlet-valve, thereby obviating the hissing sound which would result from a gradual closing of the inlet-valve, as well as insuring the same amount of water being supplied to the tank regardless of the pressure in the service-pipe. It will be further observed that in my improvement a fixed quantity of water is supplied to refill the bowl regardless of the pressure in the service-pipe, thereby not only economizing the water consumption when the pressure is great, but also insuring sufficient water for the refill when the pressure is low.

Having now fully described my invention, what I claim as new, and desire to secure by Letters Patent, is—

1. The combination with a flushing-tank for water-closet bowls, of an outlet-valve, means for opening said valve, an inlet-valve, means for automatically opening said inlet-valve and retaining the same fully open until the water supplied to the tank has reached a predetermined level, and means for refilling the bowl coincidently with the opening of the inlet-valve.

2. The combination with a flushing-tank for water-closet bowls, of an outlet-valve, means for opening said valve, an inlet-valve, means for automatically closing said inlet-valve when a predetermined amount of water has been supplied to the tank and retaining the same closed until after the discharge of the water from the tank, and means for refilling the bowl coincidently with the opening of the inlet-valve.

3. The combination with a flushing-tank for water-closet bowls, of an outlet-valve, means for opening said valve, an inlet-valve, means for opening said inlet-valve after the discharge of water from the tank and for closing said valve after the water supplied to the tank has reached a predetermined level, and means for refilling the bowl coincidently with the opening of the inlet-valve.

4. The combination with a flushing-tank for water-closet bowls, of a conduit leading from said tank for supplying water to the bowl, an outlet-valve controlling the flow of water from the tank to said conduit, a chamber for containing water, and a siphon leading from said chamber to said conduit for automatically delivering water to said conduit to refill the bowl after the discharge of the water from the tank.

5. The combination with a flushing-tank for water-closet bowls, of a conduit leading from said tank for supplying water to the bowl, an outlet-valve controlling the flow of water from the tank to said conduit, a chamber, means for supplying water to said chamber, and a siphon leading from said chamber to said conduit to refill the bowl after the closing of the outlet-valve.

6. The combination with a flushing-tank for water-closet bowls, of a conduit leading from said tank for supplying water to the bowl, an outlet-valve controlling the flow of water from the tank to said conduit, a chamber into which water is delivered from said tank, and a siphon leading from said chamber to said conduit to refill the bowl after the closing of the outlet-valve.

7. The combination with a flushing-tank for water-closet bowls, of a conduit leading from said tank for supplying water to the bowl, an outlet-valve controlling the flow of water from the tank to said conduit, a chamber into which water is delivered when the water in the tank reaches a predetermined level, means for discharging the water from said chamber to said conduit to refill the bowl after the water is discharged from the tank, and a float located within said chamber and operatively connected to the inlet-valve.

8. The combination with a flushing-tank for water-closet bowls, of a conduit leading from said tank for supplying water to the bowl, an outlet-valve controlling the flow of water from the tank to said conduit, a chamber into which water is delivered when the water in the tank reaches a predetermined level, a siphon leading from said chamber to said conduit below the outlet-valve to refill the bowl after the discharge of the water from the tank, and a float located within said chamber and operatively connected to the inlet-valve.

9. The combination with a flushing-tank for water-closet bowls, of a conduit leading from said tank for supplying water to the bowl, an outlet-valve controlling the flow of water from the tank to said conduit, a chamber within said tank into which water flows from the tank, a siphon leading from said chamber to said conduit below the outlet-valve, and a float located within said chamber and operatively connected to the inlet-valve whereby the discharge of water from said chamber refills the bowl and coincidently opens the inlet-valve.

In testimony whereof I sign this specification in the presence of two witnesses.

FREDERICK FINDEISEN.

Witnesses:
GEO. L. WILKINSON,
C. A. MULLEN.